(No Model.) 3 Sheets—Sheet 1.
W. G. CHAPIN.
MACHINE FOR MAKING TUBES OR CASES FOR PAPER BOXES, &c.
No. 440,585. Patented Nov. 11, 1890.
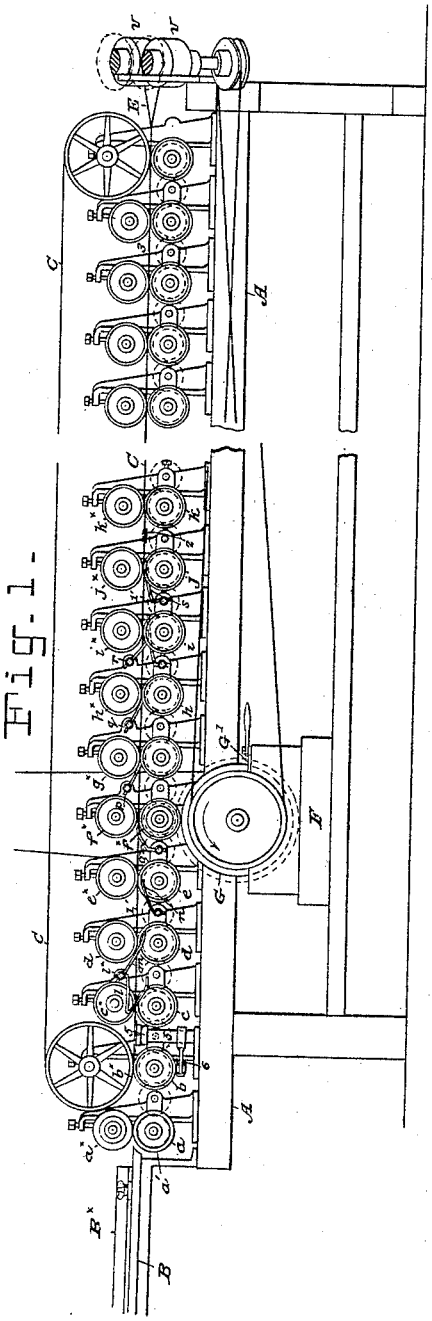
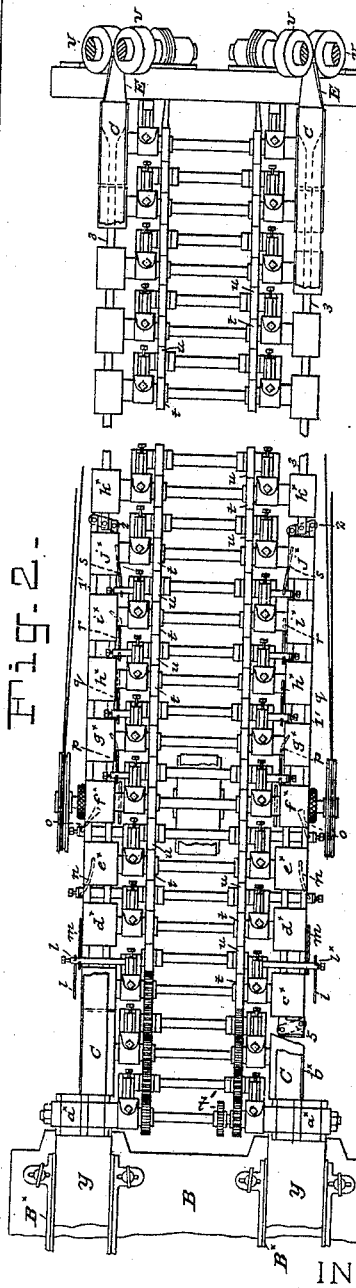
WITNESSES:
INVENTOR:
William G. Chapin,
By Henry Connett
Attorney.

(No Model.) 3 Sheets—Sheet 2.
W. G. CHAPIN.
MACHINE FOR MAKING TUBES OR CASES FOR PAPER BOXES, &c.
No. 440,585. Patented Nov. 11, 1890.
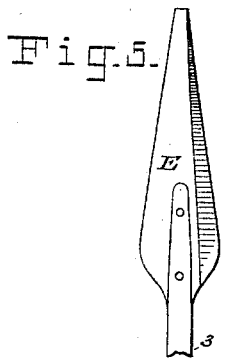
Fig. 5.
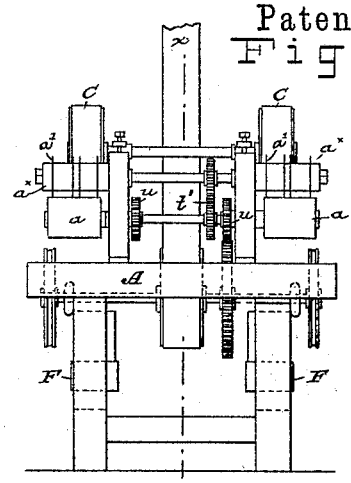
Fig. 3.
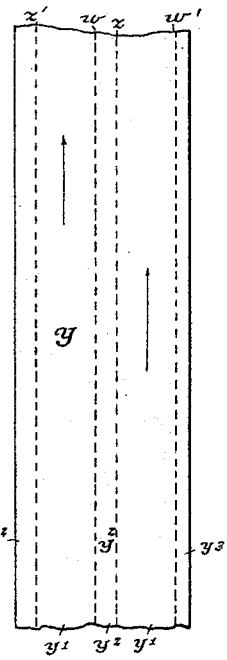
Fig. 5a
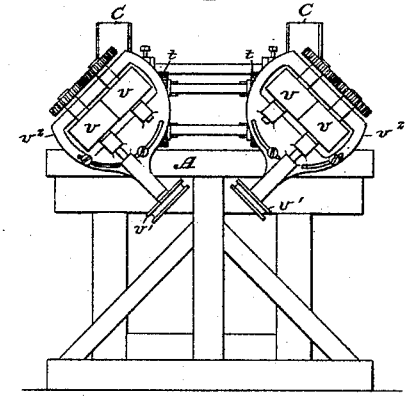
Fig. 4.
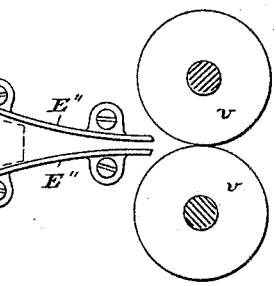
Fig. 1b.
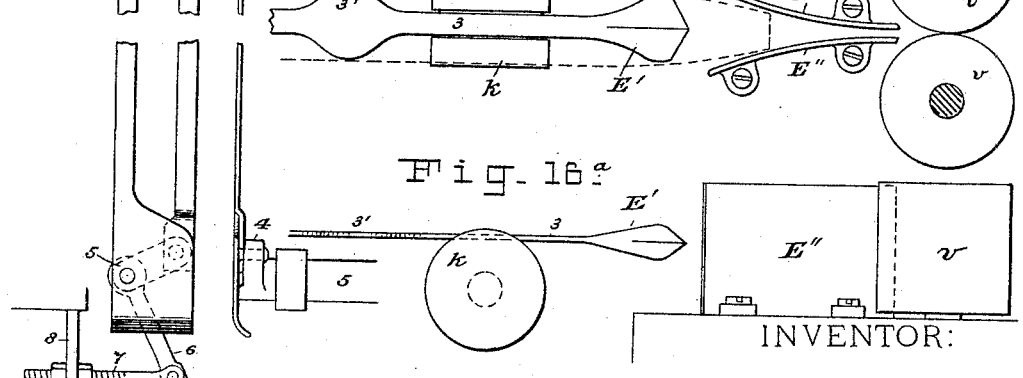
Fig. 1b.a
WITNESSES:
INVENTOR:
William G. Chapin,
By Henry Connett
Attorney.

(No Model.) 3 Sheets—Sheet 3.
W. G. CHAPIN.
MACHINE FOR MAKING TUBES OR CASES FOR PAPER BOXES, &c.
No. 440,585. Patented Nov. 11, 1890.
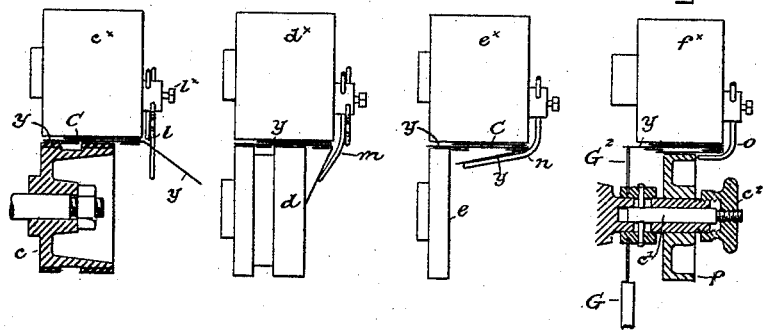
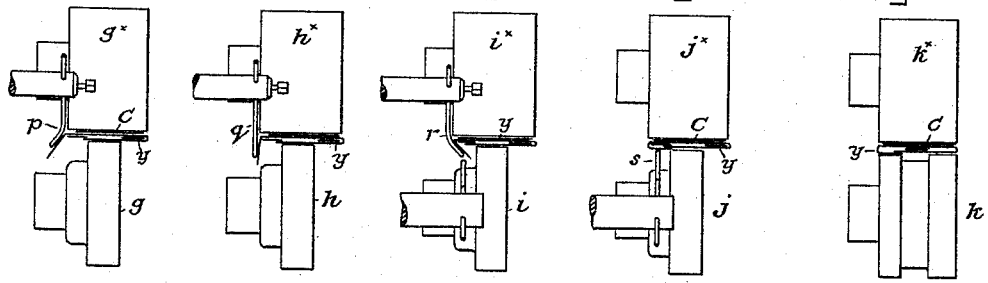
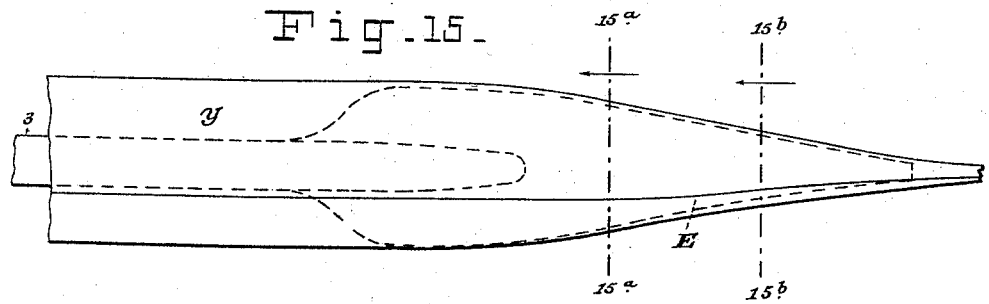
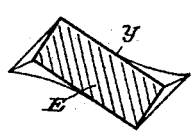
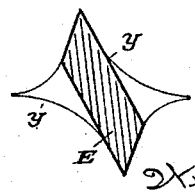
WITNESSES:
INVENTOR:
William G. Chapin,
By Henry Connett
Attorney.

UNITED STATES PATENT OFFICE.

WILLIAM G. CHAPIN, OF BROOKLYN, NEW YORK.

MACHINE FOR MAKING TUBES OR CASES FOR PAPER BOXES, &c.

SPECIFICATION forming part of Letters Patent No. 440,585, dated November 11, 1890.

Application filed July 25, 1888. Renewed September 12, 1890. Serial No. 364,733. (No model.)

*To all whom it may concern:*

Be it known that I, WILLIAM G. CHAPIN, a citizen of the United States, residing in Brooklyn, Kings county, New York, have invented certain Improvements in Machines for Making Tubes or Cases for Paper Boxes and the Like, of which the following is a specification.

My invention relates to a machine for making the rectangular "tubes" or cases of such paper boxes as are commonly used by cigarette-makers, druggists, and others. A box of this class comprises a rectangular paper tube and a "slide" or receptacle fitting into said tube. In the manufacture of such boxes the tube is generally made of considerable length, and then cut up to form the cases.

The object of my invention is to provide a machine whereby a sheet of stiff paper of the proper dimensions will be scored, folded, glued, squared, and flattened in the alternate scores, thus completing the tube by successive and continuous operations.

My invention will be fully described hereinafter, and its novel features carefully defined in the claims.

In the drawings which serve to illustrate my invention, Figure 1 is a side elevation of the machine on a small scale, and Fig. 2 is a plan view thereof. Fig. 3 is a front end view, and Fig. 4 is a rear end view, of the machine. All of these views are on a reduced scale. Fig. 5 is a plan view of the folding-blade and turner for "breaking" the alternate scores. Fig. 5$^a$ is a plan view of a portion of the blank for forming a tube, showing the score-lines. Figs. 6 to 14 are cross-sections designed to illustrate the successive operations of folding and gluing the blank or sheet to form the tube. Fig. 15 is a plan view of the turner with a tube thereon, and Figs. 15$^a$ and 15$^b$ are cross-sections of the same in the planes indicated by the dotted lines in Fig. 15. Figs. 16 and 16$^a$ illustrate another form of the turner or spreader for the tube. Figs. 5 to 14 are on a scale three times that of the principal figures, and Figs. 15 to 15$^b$ are on a scale double that of Fig. 5.

As my machine may be of any length, and as the middle portion is simply employed as a carrier to bear the tube along while it is drying, I have shown the machine in Figs. 1 and 2 as broken away just beyond the last flap-folder and between the latter and the terminal turning and flattening mechanism. In Fig. 5, also, the folding-blade is represented as broken away at two points, the parts broken away not differing in the least from those at either side of the break. In Figs. 2, 3, and 4 I have also represented the machine as double, and this is the mode of construction I prefer, for the reason that it can be so made much more economically than two machines can be built. However, as both sides of the machine are alike and the parts exact duplicates it will only be necessary for me to describe one side or operative machine.

A represents a stout frame of wood or iron, on which are mounted the bearings for the several roller and wheel shafts. The rollers are mounted on the ends of the shafts, one set of shafts serving for the two sets of rollers constituting the double machine. By reference to Fig. 3 this will be readily understood, all the mechanism on the right of the vertical median line $x$ $x$ constituting one machine and that left of said line the other. The bearings for the shafts are between these two sets of mechanism. I will describe that seen at the right in Fig. 3 and in side elevation in Fig. 1.

At the front or feeding end of the machine, which is at the left in the principal figures, is fixed a suitable bed B, to support the sheets or "blanks" destined to form the tubes, and on this bed or table are secured guides B$^\times$ B$^\times$, adapted to be adjusted thereon. The first pair of rollers directly in front of bed B are for scoring the blanks, $a$ being the lower or bed roller, and $a^\times$ the upper or scoring roller. This latter roller is provided with scoring-disks $a'$, and the lower roller may be faced with rubber or other soft material for the edges of the disks to sink into, or this roller may have grooves formed in it for this purpose. The disks $a'$ are clamped between washers and may be set so as to space the scores to suit the circumstances. By making the lower roller of yielding material I avoid the necessity of adjusting the grooves in the same to suit the spacing of the scoring-disks. The attendant feeds a blank $y$ between the scoring-rollers, and these score the blank and feed it along into the bite of the second pair of rollers $b\ b^\times$, which carry it onto the folding rollers and devices. The upper roller $b^\times$ of this pair is in the nature of a pulley and carries an endless belt C, which passes over a similar pulley at the rear end of the machine. The lower side of this belt passes between the two rollers of each pair in the series and moves with the blank which is under or beneath it. In the plan, Fig. 2, I have broken away a part of the roller or pulley $b^\times$ and the upper side of belt C, in order to avoid obscuring the parts below it.

Before following the further progress of the blank it will be necessary to digress and describe the folding blade D. (Seen detached in Fig. 5.) This blade consists, essentially, of a thin strip of metal, preferably steel, of the proper width, and it extends back beyond the point where the blank is glued and finally closed about the blade. It is provided at its rear end with a continuation or prolongation extending to the rear end of the machine, where it is connected through the medium of such prolongation with an opening and turning device E, that will be hereinafter described. At its front end the folding-blade is secured or fastened down just behind the roller $b$, and it rests on the lower rollers of the several pairs. The blade has a longitudinal slot or series of slots in it, through which the lower rollers project and bear on the blank or tube, thus pressing it upward against the belt C.

As the folds are made along the edges of the folding-blade, it is desirable that the blade shall be adjustable in width, so as to accommodate it to tubes of different widths. Therefore I prefer to construct the blade so that it may be made wider or narrower, as required. This construction is fully illustrated in Fig. 5, wherein the blade D is represented as formed of two parallel strips 1 1' of the proper length to extend through that portion of the machine where the folding and gluing is effected. These strips are coupled at their rear ends to a cross-piece 2, which is pivoted at its middle to the forward end of the prolongation or continuation 3 of the folding-blade. This prolongation connects the blade with the terminal opener and turner at the rear end of the machine. This strip 3 is narrower, by preference, than the main part of the blade D, and it extends throughout that portion of the machine through which the folded and glued tube passes while the glue is drying or setting. The front ends of the strips 1 1' are pivotally secured to a horizontal arm 4 on the upper end of an upright shaft 5. The end of strip 1 is broad, and it is pivoted at or near its edge to the arm 4, directly over the axis of shaft 5. The end of the narrower strip 1' takes under the wider strip 1, and is pivoted to arm 4 near the free end of same. By turning shaft 5 in its bearings the strip 1' may be moved nearer to or farther from the strip 1, as desired. The device employed for imparting the necessary rotation to shaft 5 is illustrated sufficiently in Fig. 5. On the lower part of shaft 5 is an arm 6, and coupled to the end of this arm is a screw-threaded rod 7, the free end of which projects through a hole in an arm 8 on some part of the machine-frame. On the end of this rod are nuts, whereby it may be secured to the arm 8 when properly adjusted. The operation of this device will be obvious.

The front end of folding-blade D is preferably turned or bent down slightly, so that the blank $y$ will readily pass in over the blade on its way to the next pair of rollers. The blank properly scored and embraced between the belt C above and the blade D below now passes on to the next pair of rollers. Fig. 5$^a$ shows the blank with the scores represented in dotted lines. The parts $y'\ y'$ form the broader sides of the tube and the parts $y^2\ y^2$ form the narrower sides or edges thereof. $y^3$ represents the edge flap, that is overlapped by the narrow side $y^2$ on the opposite edge of the blank. The glue is applied to the lower face of this narrow side $y^2$ near its margin. The arrows in Fig. 5$^a$ show the direction in which the blank is supposed to be moving. As the blank $y$ enters between the pair of rollers $c\ c^\times$, (see Fig. 6,) its advancing end encounters a laterally-arranged spring-folder $l$, mounted in an arm $l^\times$ on the machine-frame. This finger-like elastic folder $l$ bends down the blank along the score-line $z$, (seen in Fig. 5$^a$,) over the edge of the folding-blade which should coincide with this line. The blank moves on and enters between the pair of rollers $d\ d^\times$, (see Fig. 7,) and in its passage between these the partly-folded portion or flap is acted upon by another spring-folder $m$, similar to the last described, which folds it down and turns it slightly under the folding-blade. The next pair of rollers $e\ e^\times$ is peculiar in this respect, that the lower $e$ (see Fig. 8) is made very narrow in order that the portion or flap of the blank already turned down may be folded up under the folding-blade by a spring-folder $n$. The next pair of rollers $f\ f^\times$ are arranged over the glue-fountain F. Just before the advancing end of the blank enters between this pair of rollers the flap or folded portion thereon is pressed up close against the folding-blade by a spring-finger $o$, and the now partly-folded blank is nipped and carried on by these rollers. The roller $f$ is arranged under the middle of the upper roller $f^\times$, as seen in Fig. 9. In the glue-fountain is a glue feeding or supplying wheel G, which rotates in the direction of the arrow thereon in Fig. 1. This wheel is provided with a scraper G' to remove the surplus glue, and its periphery is in contact with that of a disk or roller G$^2$, which is mounted on the same shaft with roller $f$. This roller G$^2$ applies a narrow line or stripe of glue to the under side of the blank along its left-hand edge as the blank is carried on by the rollers. The blank next passes between the rollers $g\ g^\times$, (see Fig.

10,) and as it is drawn along a spring-finger $p$ bends down the sheet along the left-hand edge over that margin of the folding-blade, the blank being "broken down" along the score $z'$ in Fig. 5ª. As the blank passes in between the rollers $h\ h^\times$ next in succession, (see Fig. 11,) another spring-finger $q$ bends the flap on the blank still more. The next pair of rollers $i\ i^\times$ now seize it, and as it is borne along by these (see Fig. 12) another spring-finger $r$ turns the flap of the blank up under the folding-blade, so that it overlaps the other edge of the blank previously turned up. The next pair of rollers $j\ j^\times$ now seize the blank, (see Fig. 13,) but just as its advancing end is about to enter between them a spring-finger $s$ presses the glued flap of the blank up against the narrow strip $y^3$ in Fig. 5ª on the blank, thus effecting the junction or union of the two edges of the blank and closing the tube. The rollers $j\ j^\times$ complete the sealing or gluing. The blank is now a tube flattened along the scores $z$ and $z'$, and at this point it passes off the main wider part of the folding-blade onto the narrower part or prolongation 3 and enters in between the first pair of a series of like rollers $k\ k^\times$, Fig. 14, which occupy that part of the machine through which the tube passes during the time the glue is setting or drying. This portion of the machine may be of any length. The prolongation 3 of the blade, which is embraced by the tube, serves as a leader and guide for the tube and prevents the glue or cement from sticking one side of the flattened tube to the other side, and in order that the said prolongation may the better effect this result, and also be held in line with the grooves in the lower rollers, in which it should rest, I prefer to provide said prolongation at intervals with lateral enlargements 3', as seen in Fig. 5. These enlargements will be nearly or quite as wide as the main portion of the folding-blade, and they will be arranged to stand between the several forwarding-rollers $k$. This extension of the folding-blade or a prolongation thereof beyond the point in the machine where the tube is finally closed and sealed is an important feature of my machine, as it keeps the sides of the flattened tube from adhering together and enables the tube to be readily opened, turned, and folded in the alternate scores. It also serves to lead or guide the tube, through which it is threaded, to the terminal opener and turner.

I will say here that the lower rollers of the several pairs in the series are or may be driven positively and at a uniform speed by means of gear-wheels $t\ t$ on the roller-shafts and intermediate gear-wheels $u\ u$ to give the proper direction to the motion of the rollers. The rollers may all be driven from any one of the roller-shafts; but I prefer to drive the wheel G in the glue-fountain by a belt from a power-shaft, and to drive the shaft of roller $f$ from the shaft of wheel G through the medium of gears. The upper rollers $c^\times\ d^\times\ e^\times$, &c., are mounted on similar or like shafts and are driven by frictional contact with the belt C. The lower rollers of the series are so constructed that some portion of each projects up through the opening in the folding-blade and bears on the blank. Their construction in this respect is clearly shown in the illustrative views, Figs. 6 to 14. The part 3 of the folding-blade D stands in a circumferential recess in the lower roller $k$, and this roller bears on the blank on both sides of the blade, leaving the blade free.

The glue on the tube will have set by the time the tube has reached the rear end of the machine, and the union of the edges of the blank to form a tube will have become sufficiently strong to allow the blank to be "turned" and folded or broken along the alternate scores $w$ and $w'$ in Fig. 5ª. This is effected by the turner or turning device E, attached to the rear end of the folding-blade D. This turner E is preferably made of metal, and has a twisted or warped form, and it is flattened at both ends. The tube $y$ in Figs. 15, 15ª, and 15ᵇ, flattened and folded along the scores $z$ and $z'$, passes from the folding-blade onto the turner E, and the warped form of the latter gradually opens the tube, breaking it along the lines of the alternate scores $w$ and $w'$. As it passes over the middle portion of the turner E, the tube has its normal, open, rectangular form; but as it advances toward the rear end of the turner it is gradually flattened again, but now the folds are along the scores $w\ w'$. As the flattened tube passes off from the rear end of the turner, it enters between a pair of flattening-rollers $v\ v$, which are driven by a belt $v'$ from a pulley or sheave on the shaft of the wheel G in the glue-fountain. The tube emerges from these rollers in a finished state and ready for cutting into the proper lengths.

In the drawings I have shown the blank or sheet $y$ scored in such a manner as to produce a rectangular tube of very unequal dimensions, and have shown the machine set and arranged for producing a tube of this character; but it will be obvious that the machine is capable of making square tubes as well, and those having sides varying in all proportions in width.

In order that my machine may be used for making tubes of different proportions with respect to the width of their sides, the scoring-disks $a'$ are made adjustable on roller $a^\times$, the folding-blade is made adjustable as to width, the turner E is attached removably to the end of the folding-blade for convenience of substitution to suit tubes of different proportions, and the final rollers $v$ for flattening the finished tube are mounted in a frame or plate $v^2$, whereby the obliquity of the rollers' axes may be varied, and the rollers thus set so as to properly receive the tube from the turner. It will be understood that this obliquity of the rollers $v$ will vary as the proportion of the sides of the tube varies. If the tube is square in cross-section, the axes of the rollers $v$ will stand upright or vertical. The frame $v^2$ consists of a plate secured to the machine-frame by bolts fixed in said frame and passing through curved slots in the plate. The projecting ends of the bolts are provided with suitable washers and nuts, which serve to secure the slotted plate to the machine-frame in any position that it may be set. The rollers $v\ v$ are mounted in bearings on this plate.

By inspection of Fig. 2 and Figs. 6 to 14 it will be seen that while the outer ends of the upper rollers $c^\times\ d^\times\ e^\times$, &c., are even or aligned, the inner ends of same are not—that is to say, the first three rollers $c^\times$, $d^\times$, and $e^\times$ are all long, while the roller $f^\times$ is short. The object of this is to prevent the glue-applying disk $G^2$ from applying glue to said roller when no blank is passing. The rollers $g^\times\ h^\times\ i^\times\ j^\times$ are also made shorter, in order to provide room for the folders $p\ q\ r\ s$.

In order to enable the disk $G^2$ to be adjusted along the shaft of roller $f$, this shaft has a bore formed in it to receive a stem $c'$, which is connected with the boss of said disk through slots in the tubular shaft. On the outer end of said stem is screwed a cup-nut $c^2$, which screws also onto the end of the roller-shaft. The screw-threads in the nut $c^2$ differ in pitch, and when the nut is run in or out it will run the disk $G^2$ in or out along the tubular stem on which it is mounted. The stem $c'$ might be collared in the nut.

The upper rollers of the several pairs are or may be fixed on shafts extending across the machine similar to the shafts of the lower rollers, and the bearings in which they run may be made adjustable up and down in a well-known way; but this is not absolutely essential. The roller-shafts may be all mounted in unyielding bearings, and the peripheries of the lower rollers may be covered with rubber, in order that they may yield enough to make room for the blank; but this construction is not essential.

The belt C and folding-blade D are best made from metal; but I do not wish to limit myself to the use of any particular material in their construction. The object in making the folding-blade adjustable wholly at the outer edge is that the other side may always stand in the same relative position with respect to the lower rollers. If the rollers are properly made, the folded and glued tube will be carried by them straight onto the terminal opener or turner; but a lateral guide or guides may be employed to keep the tube straight, if they shall be deemed necessary.

The upper scoring-roller is driven from the lower roller by suitable gears $t'$. (Seen in Figs. 2 and 3.)

It is not absolutely necessary to extend the belt C throughout the entire length of the machine; but it should extend to the first pair of rollers $k\ k^\times$, where the tube passes off from the wider operative part to the narrower part or continuation of the folding-blade.

The object of the folding-fingers $l$, $m$, $n$, $p$, $q$, and $r$ is to gradually turn down the free flaps of the blank and break it along the lines of the scores $z$ and $z'$, and while I have shown a sufficient number of these to effect the purpose with ordinary material more may be used to effect the folding in a more gradual manner. In order to effect the folding along the lines of the scores and to avoid pushing the blank sidewise by the application of too much force, thereby folding the blank outside of the score-line, I employ elastic or spring-like folders which will yield if the blank offers an unusual resistance. This elasticity in the folders, taken in connection with their gradual and successive action on the blank, insures the correct folding of the latter along the lines where it is weakened by the scoring. Spring-wire bent to the proper shape forms a suitable material for these folders. The folders $o$ and $s$ need not be so elastic, as they only act on the flaps after the folds have been effected. The lower rollers of the series that act on the blank to move or carry it along may have rubber-covered faces.

The object I have in view in mounting the rollers on the outer ends of their shafts or studs is this: it is desirable to leave the folding-blade (and the belt C also) free to be removed for cleaning, as they are liable to become coated or fouled with glue, and the construction shown places these parts, as well as the rollers, in a much better position to be reached for cleaning than if the rollers had bearings at their outer ends also.

Where the machine is constructed double, as shown in Figs. 2, 3, and 4, the two operative machines may be adjusted or set for making tubes of different kinds, and the two machines need not be fed uniformly, as there is no "timing" required.

I do not consider the belt C as absolutely essential to the successful operation of machine; but it serves the purpose of a moving backing for the blank.

The machine might be inverted and operated in that position; but it would not be so convenient to supply the roller $G^2$ with glue under such conditions.

The scoring-rollers and the flattening-rollers $v\ v$, either or both, might be omitted. If the scoring-rollers were omitted, the blanks would have to be scored before being fed to the receiving and forwarding rollers $b\ b^\times$, and if the flattening-rollers $v\ v$ were omitted this flattening operation would have to be performed subsequently. I prefer to form the machine as shown, and thus complete the tube at one operation.

The gluing mechanism herein shown will serve as well as any; but any well-known mechanism for the purpose may be employed as well.

Under that portion of the machine occupied by the rollers $k$ $k^\times$ a heating-coil might be placed, in order to hasten the setting of the glue; but this is not an essential feature.

In constructing the turning device E the workman may take a tube of stiff paper—such as the machine is designed to make—flatten one end of it in one set of scores and flatten the other end in the alternate set of scores. The tube will then have the warped form and proportions necessary for the turner E; but the latter will of course have to be reduced in dimensions to correspond with the inside measurements of the tube.

In Figs. 16 and 16ª I have shown another form of terminal turning device for the tube, the former being a plan and the latter a side view of the device. In this form of the turner a wedge-like opener E' is attached to the rear end of the prolongation 3 of the folding-blade, and this device serves to open the tube as it passes off from the blade. The advancing end of the opened tube enters between converging side guides E'', which gradually compress the tube laterally, first giving it a rectangular form and then flattening it in the alternate scores. The guides lead the tube into the bite of the flattening-rollers $v$ $v$.

It will be understood that the tube can be easily turned and flattened in the alternate creases after it has been once started open; and therefore the important feature of this part of my invention is the connection of the folding-blade proper with a terminal tube opener and turner by a prolongation or extension that serves to lead the flattened tube from the former to the latter. The opening or turning device may be constructed in various ways.

My machine is capable of making tubes from continuous strips of paper; as well as from sheets or blanks.

In Figs. 1 and 2 the gears on the flattening-rollers $v$ $v$ are not shown, as their presence would only obscure the drawings; but they are clearly shown in Fig. 4. In Fig. 5 a part of the folding-blade is represented in side elevation in order to better illustrate this part of the machine. The table B is broken off in Figs. 1 and 2, partly for lack of room and partly because it is not necessarily limited as to length.

Having thus described my invention, I claim—

1. In a machine for making tubes or cases of the character described, the combination, with rollers for forwarding the scored blank, folders for folding the blank into the form of a flattened tube, and mechanism for applying the glue to the blank, of rollers for carrying the tube while the glue is setting or drying, and the folding-blade about which the tube is formed, provided with a prolongation which extends beyond the last folder, substantially as and for the purposes set forth.

2. In a machine for making tubes or cases of the character described, the combination, with rollers for forwarding the scored blank, folders for folding the blank into the form of a flattened tube, mechanism for applying glue to the blanks, and rollers for carrying the tube while the glue is setting or drying, of the folding-blade about which the tube is formed, a terminal tube-opener, and a prolongation of the folding-blade, which connects said blade with said opener, substantially as set forth.

3. In a machine for making tubes or cases of the character described, the combination, with rollers for forwarding the scored blank, folders for folding the blank into the form of a flattened tube, mechanism for applying glue to the blank, and a folding-blade about which the tube is formed, of a terminal tube-opener and turner, which folds the tube in the alternate scores, and a prolongation of the folding-blade, which connects the blade with said tube opener and turner, substantially as set forth.

4. In a machine for making tubes or cases of the character described, the combination, with rollers for forwarding the scored blank and folders for folding the blank into the form of a flattened tube, of a folding-blade having a longitudinal slot or aperture through which some part of the peripheries of the said rollers project, substantially as set forth.

5. The combination, with rollers for forwarding a scored blank and a folding-blade, of a series of yielding or spring-like folders arranged to act successively on the moving blank, as described, whereby the folding of the blank in the scores is effected gradually, as set forth.

6. The combination, with the terminal opener and turner E for the tube, said turner having flattened ends and warped intermediate portions, of the obliquely-arranged terminal flattening-rollers $v$ $v$, arranged to receive the turned tube from the turner E and flatten it in the other set of creases, as set forth.

7. The combination, with the forwarding-rollers and their driving mechanism, the upper bearing-rollers, the folding-blade, and the folders, of the belt C, the lower side of said belt being arranged between the upper and lower rollers and above the folding-blade.

8. In a machine for making tubes or cases from scored blanks, the combination, with the folding-blade about which the tube is formed and its prolongation, of a terminal opener and turner secured to said prolongation, said turner having flattened ends and a warped intermediate portion, whereby the blank in passing over the same will be folded in the alternate creases, as set forth.

9. The combination, with the folding-blade D, consisting of two parallel strips 1 1', pivotally connected to a cross-piece 2, and the prolongation 3, to which said cross-piece is pivoted, of an upright shaft, as 5, having an arm, as 4, on its upper end to which the forward ends of the strips 1 1' are attached, an arm, as 6, on said shaft, and the screw and nuts for holding said shaft against rotation.

10. The combination, with the forwarding-rollers, of the folding-blade provided with a narrow prolongation, as 3, and said prolongation provided with a lateral enlargement 3', substantially as and for the purposes set forth.

In witness whereof I have hereunto signed my name in the presence of two subscribing witnesses.

WILLIAM G. CHAPIN.

Witnesses:
 HENRY CONNETT,
 J. D. CAPLINGER.